(12) United States Patent
Faroudja

(10) Patent No.: US 8,804,813 B1
(45) Date of Patent: Aug. 12, 2014

(54) PROGRESSIVE SCAN VIDEO PROCESSING

(71) Applicant: Faroudja Enterprises Inc., Los Altos, CA (US)

(72) Inventor: Yves Faroudja, Los Altos, CA (US)

(73) Assignee: Faroudja Enterprises Inc., Los Altos, CA (US)

( * ) Notice: Subject to any disclaimer, the term of this patent is extended or adjusted under 35 U.S.C. 154(b) by 0 days.

(21) Appl. No.: 13/860,625

(22) Filed: Apr. 11, 2013

Related U.S. Application Data

(60) Provisional application No. 61/760,275, filed on Feb. 4, 2013.

(51) Int. Cl.
*H04N 7/50* (2006.01)
*H04N 5/783* (2006.01)

(52) U.S. Cl.
USPC .......................................... 375/240; 386/264

(58) Field of Classification Search
USPC ........................................................ 375/240
See application file for complete search history.

(56) References Cited

U.S. PATENT DOCUMENTS

| | | | | |
|---|---|---|---|---|
| 5,389,918 A * | 2/1995 | Kusaka et al. | ................ | 348/699 |
| 5,452,021 A * | 9/1995 | Kusaka et al. | ................ | 348/699 |
| 6,839,094 B2 * | 1/2005 | Tang et al. | .................... | 348/607 |
| 7,417,686 B2 * | 8/2008 | Zhu | ............................... | 348/448 |
| 7,453,518 B2 * | 11/2008 | Kimoto | ......................... | 348/448 |
| 8,059,198 B2 * | 11/2011 | Chen et al. | .................... | 348/451 |
| 8,213,501 B2 * | 7/2012 | Boon et al. | .............. | 375/240.02 |
| 8,508,660 B2 * | 8/2013 | Chang et al. | .................. | 348/448 |
| 2003/0112369 A1 * | 6/2003 | Yoo et al. | ....................... | 348/448 |
| 2008/0137734 A1 * | 6/2008 | Boon et al. | .............. | 375/240.02 |
| 2008/0219353 A1 * | 9/2008 | Chang | ...................... | 375/240.21 |
| 2011/0084971 A1 * | 4/2011 | Kuo et al. | ...................... | 345/501 |
| 2012/0114260 A1 * | 5/2012 | Takahashi et al. | ............ | 382/238 |

OTHER PUBLICATIONS

U.S. Appl. No. 13/860,635, filed Apr. 11, 2013, entitled, "Multidimensional Video Processing."

* cited by examiner

*Primary Examiner* — Sath V Perungavoor
*Assistant Examiner* — Howard D Brown, Jr.
(74) *Attorney, Agent, or Firm* — Convergent Law Group LLP

(57) ABSTRACT

A method and system for separating even and odd lines in a progressive video signal comprises generating from the even lines simulated odd lines, comparing the simulated odd lines with the original odd lines to obtain a support signal, and transmitting the even lines and the support signal in order to reconstitute the full picture. Alternatively, separating odd and even lines may be replaced by separating high- and low-frequency vertical signal components, generating from the low-frequency vertical signal components simulated high-frequency vertical signal components, comparing the simulated high-frequency vertical signal components with the original high-frequency signal components to obtain a support signal.

8 Claims, 9 Drawing Sheets

PROGRESSIVE SCAN VIDEO PROCESSING

CROSS-REFERENCE TO RELATED APPLICATIONS

This application claims the benefit of provisional Patent Application Ser. No. 61/760,275, filed Feb. 4, 2013, and is assigned to the Assignee of the present application and incorporated herein by reference.

BACKGROUND

In progressive video scanning, successive scanning lines are vertically aligned from frame to frame. For example, in the 1080p/60 standard (1080 scanning lines per frame, 60 frames per second), line 1 of frame 2 is scanned at the same vertical location as is line 1 of frame 1, and so are lines 1 of frames 3, 4, etc. For interlaced video, line 1 of field 2 is vertically located between line 1 and line 2 of field 1, and so is line 1 of field 4, while line 1 of field 3 is vertically coincident with line 1 of field 1.

An interlaced signal is composed of a succession of even and odd fields, two successive fields making a frame. For example, in the 1080i/60 standard (1080 lines interlaced, 60 fields per second), each field is composed of 540 lines, and there are 60 fields or 30 frames per second. A frame is composed of one even field and one odd field in succession.

A progressive scan video signal is composed of horizontal lines drawn consecutively in sequence. In describing aspects of the present invention herein, reference is made to "even" and "odd" lines of a progressive scan video signal, "even" lines being the second line and every other consecutive line (i.e., lines 2, 4, 6, etc.) and "odd" lines being the first line and every other consecutive line (i.e., lines 1, 3, 5, etc.) or vice-versa (in the case of a progressive scan video signal, the designations "even" and "odd" are arbitrary). In cases in which a progressive scan video signal is derived from an interlace scan video signal, "even" lines are typically labeled as those derived from "even" fields and "odd" lines are typically labeled as those derived from "odd" fields.

Interlaced video has been used since the early days of television, and has been slowly falling into disfavor, and replaced by progressive scan for more and more applications, mostly because of the specific needs of computer or computer-like displays. More recent television displays such as LCDs or DLPs can only be driven with a progressive scan. In these cases, interlaced signals have to be de-interlaced, which is costly and difficult.

The main advantages of progressive scan (as compared to interlace scan) are 1) absence of interlace artifacts, such as line twitter, serrations, flicker, etc., 2) ease of processing, from a camera to a display, and 3) ease of digital processing, such as bandwidth or bit-rate compression. The main disadvantage of progressive scan is an increase by a ratio of two of bandwidth requirements, as compared to an interlaced standard having the same field rate as the comparable progressive scan standard.

Digital compression systems require a high bit count (equivalent to large bandwidth) to process the progressive scan video signal with an acceptable quality. The requirements for bandwidth are increasing daily, and the available bandwidth provided by present communication channels is limited. For example, more than 50% of the Internet traffic is occupied by video.

Broadcasters are no longer satisfied with present HDTV standards (1080i and 720p) and would like to move to higher scan rates (e.g., "4K", which is approximately 2000×4000 pixels) or higher frame rates (120 Hz). Furthermore, interlace standards, which in the past employed analog transmission, reduced the bandwidth requirements by two at the cost of image quality (artifacts). Interlacing does not present such an advantage in compression systems, and is not computer-friendly.

Thus, increased bandwidth, or for a more efficient use of the bandwidth available on different media are required.

Compression standards are slowly improving, getting more efficient in packing an increasing data load into increasingly over-worked channels, but an improvement by a ratio of two in the bandwidth utilization (Mb/s for a constant channel) occurs only every eight to ten years or so.

A need has arisen to reduce the bandwidth of progressive scan video signals while maintaining a reasonable image quality.

SUMMARY OF THE INVENTION

In a first aspect of the invention, a method for processing a progressive scan video signal is disclosed, the video signal having scan lines in which one set of alternate consecutive scan lines are designated as even scan lines and another set of alternate consecutive scan lines, offset by one scan line from the first set, are designated as odd scan lines. The method comprises separating the even and odd scan lines of the progressive scan video signal and selecting the even scan lines, deriving a simulation of the odd scan lines from the selected even scan lines, subtracting the simulation of the odd scan lines from the selected odd scan lines to obtain an error signal, and transmitting or storing the selected even scan lines and the error signal. Optionally, the deriving may include an encoder and a complementary decoder.

In another aspect of the invention, a method for processing a modified progressive scan video signal is disclosed, the video signal comprising even scan lines of a progressive scan video signal and an error signal, the error signal representing a difference between the odd scan lines of the progressive scan video signal and a simulation of the odd scan lines, wherein even scan lines are one set of alternate consecutive scan lines in the progressive scan video signal and odd scan lines are another set of alternate consecutive scan lines in the progressive scan video signal, offset by one scan line from the first set. The method comprises deriving from the even scan lines in the modified progressive scan video signal a simulation of the odd scan lines of the progressive scan video signal, improving the reconstruction of the odd scan lines of the progressive scan video signal by using the error signal, and combining the even scan lines and the improved reconstruction of the odd scan lines of the progressive scan video signal to provide a complete line scan of the progressive scan video signal.

In yet another aspect of the invention, a method for processing a progressive scan video signal comprises separating the low frequency vertical signal components and the high frequency vertical signal components of the progressive scan video signal, deriving a simulation of the high frequency vertical signal components from the low frequency vertical signal components of the progressive scan video signal, subtracting said simulation from the high frequency vertical components separated from the progressive scan video signal to obtain an error signal, and transmitting or storing the low frequency vertical signal components of the progressive scan video signal and the error signal (support out). Optionally, the deriving may include an encoder and a complementary decoder.

In another aspect of the present invention, a method for processing a modified progressive scan video signal is disclosed, in which the signal comprises the low frequency vertical signal components of a progressive scan video signal and an error signal, the error signal representing a difference between the high frequency vertical signal components of the progressive scan video signal and a simulation of those signal components, the method comprises deriving from the modified progressive scan video signal a simulation of high frequency vertical signal components of said progressive scan video signal, improving the reconstitution of the high frequency vertical signal components of said progressive scan video signal by using the error signal, and combining the improved reconstitution of the high frequency vertical signal components of said progressive scan video signal and the low frequency vertical components of said progressive scan video signal to provide a full bandwidth of the progressive scan video signal.

In another aspect of the present invention, a method for processing a progressive scan video signal is disclosed, the video signal having scan lines in which one set of alternate consecutive scan lines are designated as even scan lines and another set of alternate consecutive scan lines, offset by one scan line from the first set, are designated as odd scan lines, the method comprises separating the even and odd scan lines of the progressive scan video signal and selecting the even scan lines, deriving a simulation of the odd scan lines from the selected even scan lines, subtracting the simulation of the odd scan lines from the selected odd scan lines to obtain an error signal, deriving from the even scan lines a simulation of the odd scan lines of the progressive scan video signal, improving the reconstruction of the odd scan lines of the progressive scan video signal by using the error signal, and combining the even scan lines and the improved reconstruction of the odd scan lines of the progressive scan video signal to provide a complete line scan of said progressive scan video signal.

In yet a further aspect of the present invention, a method for processing a progressive scan video signal comprises separating the low vertical frequency and high frequency vertical signal components of the progressive scan video signal, deriving a simulation of the high frequency vertical signal components of the progressive scan video signal from the low frequency vertical signal components, subtracting said simulation from the high frequency vertical signal components separated from the progressive scan video signal to obtain an error signal, deriving from the modified progressive scan video signal a simulation of high frequency vertical signal components of said progressive scan video signal, improving the reconstitution of the high frequency vertical signal components of said progressive scan video signal by using the error signal, and combining the improved reconstitution of the high frequency vertical signal components of said progressive scan video signal and the low frequency vertical components of said progressive scan video signal to provide a full bandwidth of the progressive scan video signal.

Exemplary embodiments provide methods and systems for processing a progress scan video signal. Aspects of the exemplary embodiments include separating the second line and every other line consecutive line in the progress scan video signal (i.e., the "even" lines) from the remaining lines (i.e., the "odd" lines), or vice-versa (separating the "odd" lines from the remaining "even" lines); generating from the even lines simulated odd lines (such simulated lines may be referred to alternatively as "approximated", "reconstituted" or "regenerated"); comparing the simulated odd lines with original odd lines in the progress scan video signal to obtain a support signal (a type of error signal); and transmitting or storing the even lines and the support signal in order to reconstitute a video signal that simulates the original progressive scan video signal and has both even and odd lines.

In an alternative embodiment, separating odd and even lines is replaced by a process that separates high- and low-frequency vertical signal components of the progressive scan video signal in every line and reduces or eliminates the high-frequency vertical signal components, as by applying, for example, a vertical-signal-component low-pass filter. This may be accomplished, for example, by generating simulated high-frequency vertical signal components from low-frequency vertical signal components. By "high-frequency vertical signal components" is meant image frequency components that contribute to resolution in the vertical domain ("vertical-domain resolution"). Simulated high-frequency vertical signal components are compared with the original high-frequency vertical signal components to obtain a support signal. The low-frequency vertical video signal components may be enhanced in the vertical domain, for example, by a non-linear process that generates high-frequency vertical video signal components, such frequencies being similar in amplitude and phase to those reduced or eliminated by a vertical low-pass filter.

The support signal is the difference between the original high-frequency vertical video signal components and simulated high-frequency vertical video signal components obtained, for example, by a non-linear process operating on the low-frequency vertical video signal components. If the simulation is well done, the support signal may be small such as close to zero or zero, and may require that only a narrow bandwidth support signal be transmitted or stored.

The various features of the present invention and its preferred embodiments may be better understood by referring also to the following discussion and the accompanying drawings in which like reference numerals refer to like elements in the several figures. The contents of the discussion and the drawings are set forth as examples only and should not be understood to represent limitations upon the scope of the present invention.

DETAILED DESCRIPTION OF THE INVENTION

The exemplary embodiments relate to methods, devices and systems for processing a progressive scan video signal and a modified progressive scan video signal. The following description is presented to enable one of ordinary skill in the art to make and use the invention and is provided in the context of a patent application and its requirements. Various modifications to the exemplary embodiments and the generic principles and features described herein are readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments are described with respect to systems and/or devices having certain components. However, the systems and/or devices may include more or fewer components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in alternative time order that are not inconsistent with the exemplary embodiments. Thus, the present invention is not intended to be limited to the embodiments shown, but is to be accorded the widest scope consistent with the principles and features described herein.

Figure 1:
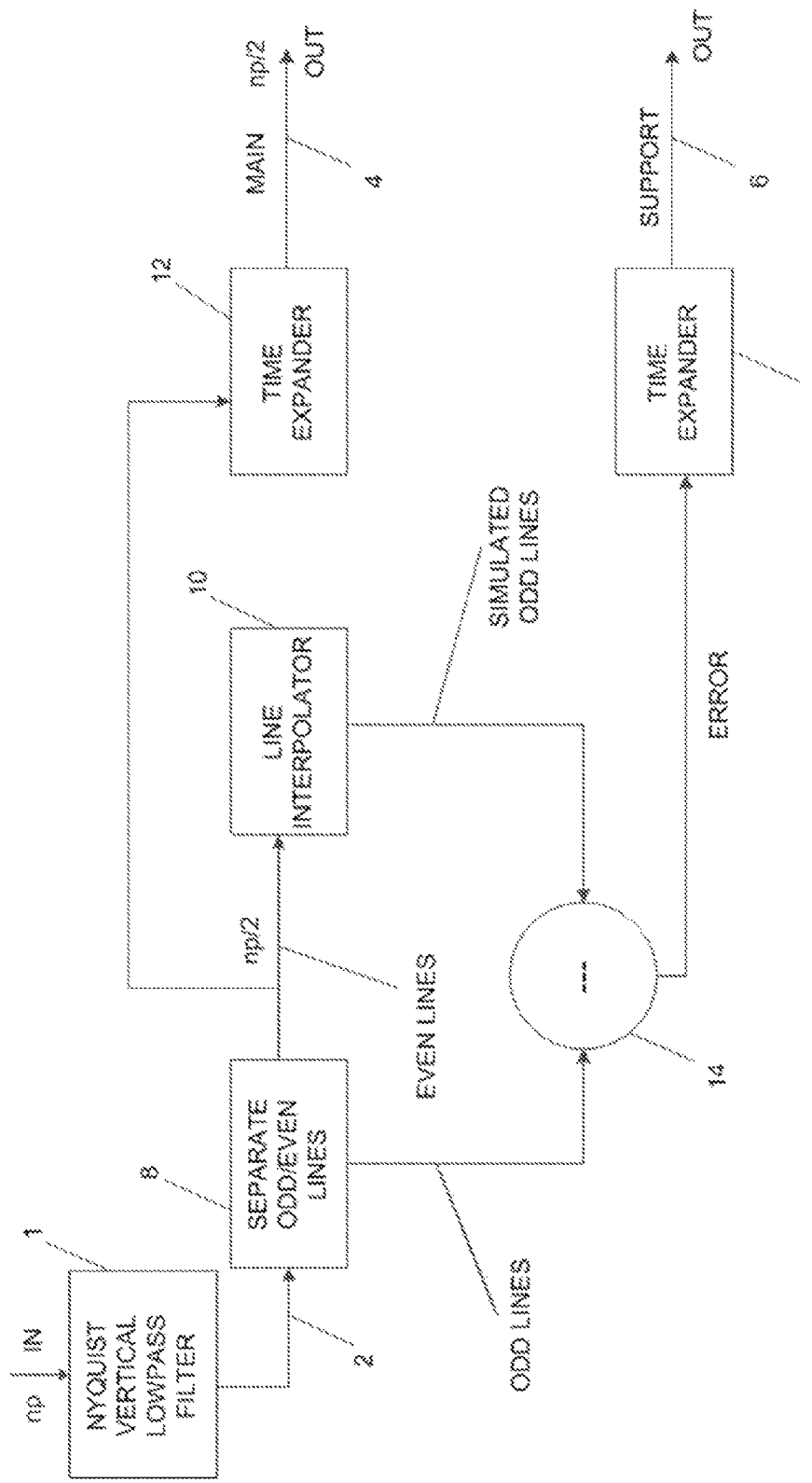
FIG. 1 is a schematic block diagram embodying aspects of the present invention, illustrating the processor generating from a progressive scan video input signal having n progressively scanned lines per frame, which may be designated "np", a modified progressive scan video output signal having n/2 lines per frame, which may be designated "np/2" and a support (error) signal. The letter "p" indicates a progressive scan format. The letter "n" indicates the number of scan lines (thus "np/2" indicates a progressive scan video signal having n/2 scan lines.

FIG. 1 is a schematic block diagram of a processor in accordance with aspects of the present invention that receives a progressive scan input video signal 2 having n progressively scanned lines per frame to generate a modified progressive scan output video signal 4 having n/2 progressively scanned lines per frame, and a support signal 6.

A progressive scan video input signal 2 having n progressively scanned lines per frame, which may be designated "np", may be applied first to a "Nyquist Vertical Low-Pass Filter" device or function ("Nyquist Filter") 1 characterized in that its frequency domain response in the vertical domain satisfies the Nyquist criterion. It is possible, particularly with computer-generated alphanumeric characters, or graphics, that the progressive scan input signal contains vertical frequency signal components in excess of the Nyquist frequency (half of the scanning line frequency), and these frequencies may, later in the video processing, generate undesirable artifacts.

A "Separate Odd/Even Lines" device or function ("Separator") 8 receives the Nyquist filter output, separates even lines from odd lines of the input signal 2, and selects the even lines. It will be appreciated that either the "even" lines or the "odd" lines may be selected and processed—the result is equivalent. The way in which even and odd lines are separated from each other is easily accomplished in many different ways and is not critical to the invention.

A "Line Interpolator" device or function ("Interpolator") 10 receives the even lines from device or function 8, and performs an interpolation process in order to generate simulated "odd" lines of the input signal 4. Interpolators are well known in the art and the selection of any particular interpolator is not critical to the invention. In general, simple interpolators tend to be less effective, have errors, and require a high transmission bandwidth (such as simple averaging of the line before and the line after) and have errors, therefore requiring a high transmission bandwidth. Some are very sophisticated (see, for example, U.S. Pat. No. 6,133,357) and are very accurate.

A time expander device or function ("Time Expander") 12 receives the even lines from device or function 8 and expands by two the time scale of the signal in order to deliver an output signal 4 having n/2 progressively scanned lines per frame. The Time Expander reads out the selected lines at half the rate they were inputted. A subtractor device or function ("Subtractor") 14 (shown schematically as a minus sign within a circle) is an arithmetic subtractor that subtracts the separated out "odd" lines signal outputted by Separator 8 from the simulated "odd" lines outputted by Line Interpolator 10 in order to generate a "support" error signal representative of the differences between "odd" lines and simulated "odd" lines. Time expander ("Time Expander") 16 is a time expander by two, identical in function to the Time Expander 12 time expander. It receives the error signal from Subtractor 14 to deliver the support signal output 6.

Figure 2:
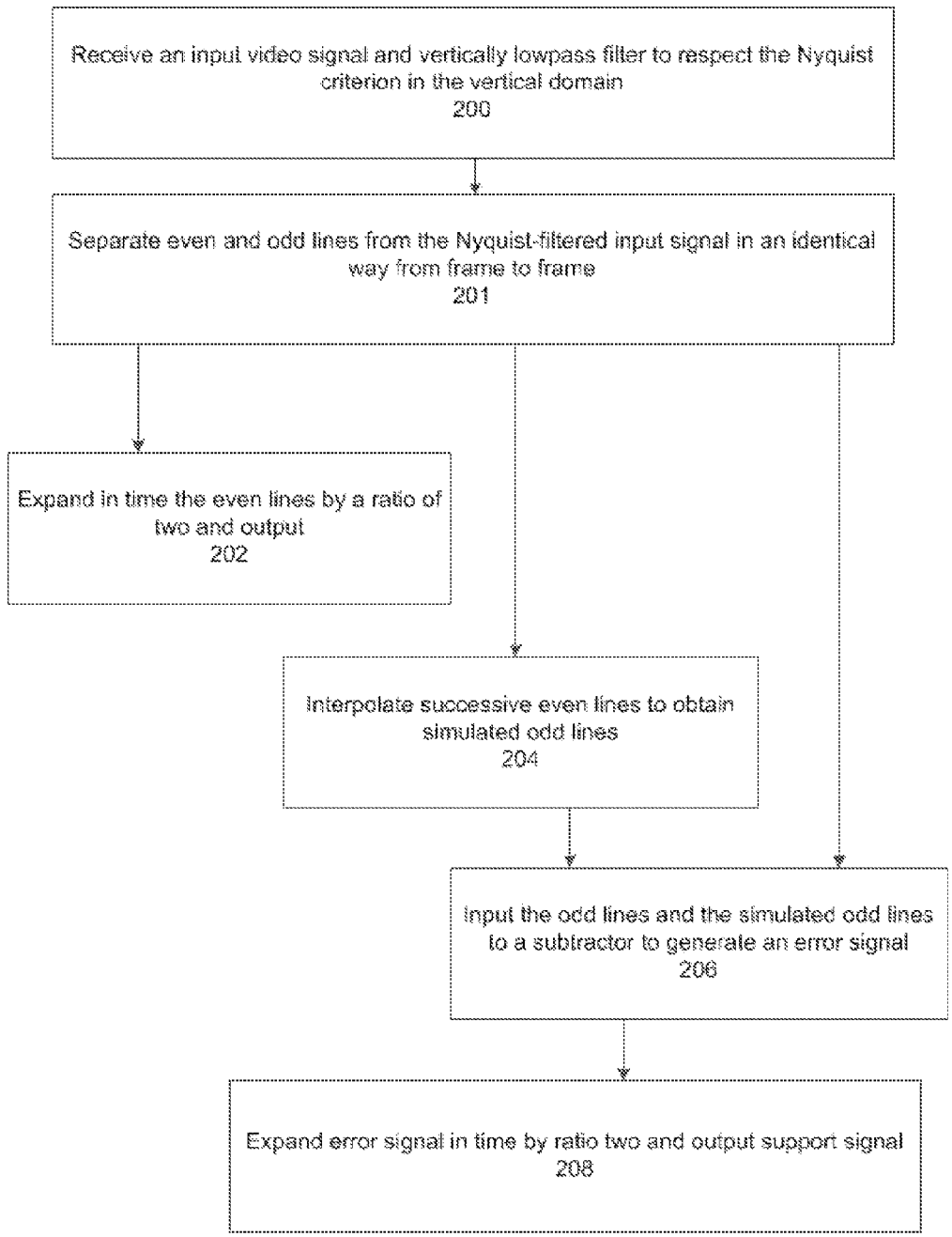
FIG. 2 is a flow diagram, which may be compared to FIG. 1, illustrating a process for processing a progressive scan video signal in accordance with aspects of the present invention.

FIG. 2 is a flow diagram, based on FIG. 1, illustrating a process for processing a progressive scan video signal. The process may begin by receiving an input progressive scan video signal having n progressively scanned lines per frame and vertical low-pass filtering the signal so as to provide a signal that respects (complies with) the Nyquist criterion in the vertical domain (block 200). In an identical way from frame to frame, a separator receives the filtered input signal and separates even and odd lines and selects even lines (block 201). A time expander expands in time the even lines by a ratio of two and outputs n/2 progressively scanned lines per frame (block 202) in a continuous data flow. The line interpolator interpolates two or more successive even lines to obtain simulated odd lines (block 204). The odd lines are input to a subtractor along with the simulated odd lines to generate an error signal (block 206). "Odd" lines are subtracted from simulated (interpolated) odd lines. Processing in blocks 201, 202, 204 and 206 may be performed in parallel. A time expander expands the error signal in time by the ratio two and outputs a support signal (block 208).

Figure 3:
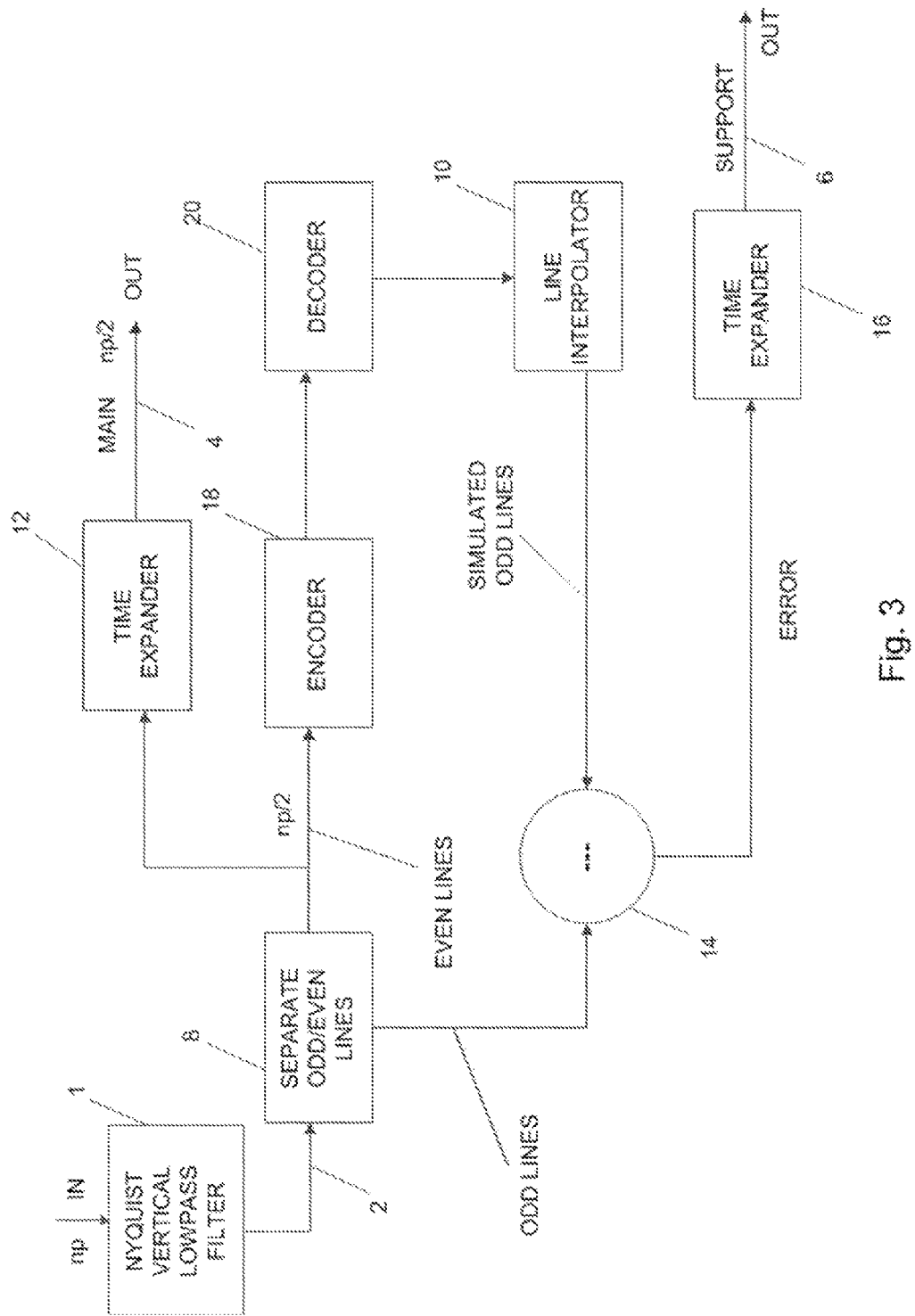
FIG. 3 is a schematic block diagram embodying aspects of the present invention illustrating a processor similar to the FIG. 1 processor, but including a combination encoder-decoder in the support path.

FIG. 3 is a schematic diagram embodying aspects of the present invention illustrating a processor similar to the FIG. 1 processor, but further including a combination encoder-decoder, which may be a bit-rate compression-decompression process or a progressive scan to interlace scan conversion, for example. This approach ideally requires tracking between the encoding process in the support signal generation loop and the one used for transmission-reception in the support path. The processor also makes use of a progressive scan video signal having n progressively scanned lines per frame to generate a progressive scan output having n/2 progressively scanned lines per frame, and a support signal. Blocks 1, 8, 10, 12, 14 and 16 are identical in structure and functions to the corresponding devices and functions in FIG. 1. Encoder function or device 18 is an encoder, simulating the effect of an encoder that may be in the transmission or recording path, and is followed by Decoder function or device 20. Decoder 20 is a decoder complementary to encoder 18 and duplicating the structure and function of a decoder that may be used at the receiving or reproduction end of the transmission or storage path. Devices or functions 18 and 20 are inserted between Separator 8 and Subtractor 14. They contribute to generating simulated odd lines that are closer to ideal simulated "odd" lines than if they were not employed.

Figure 4:
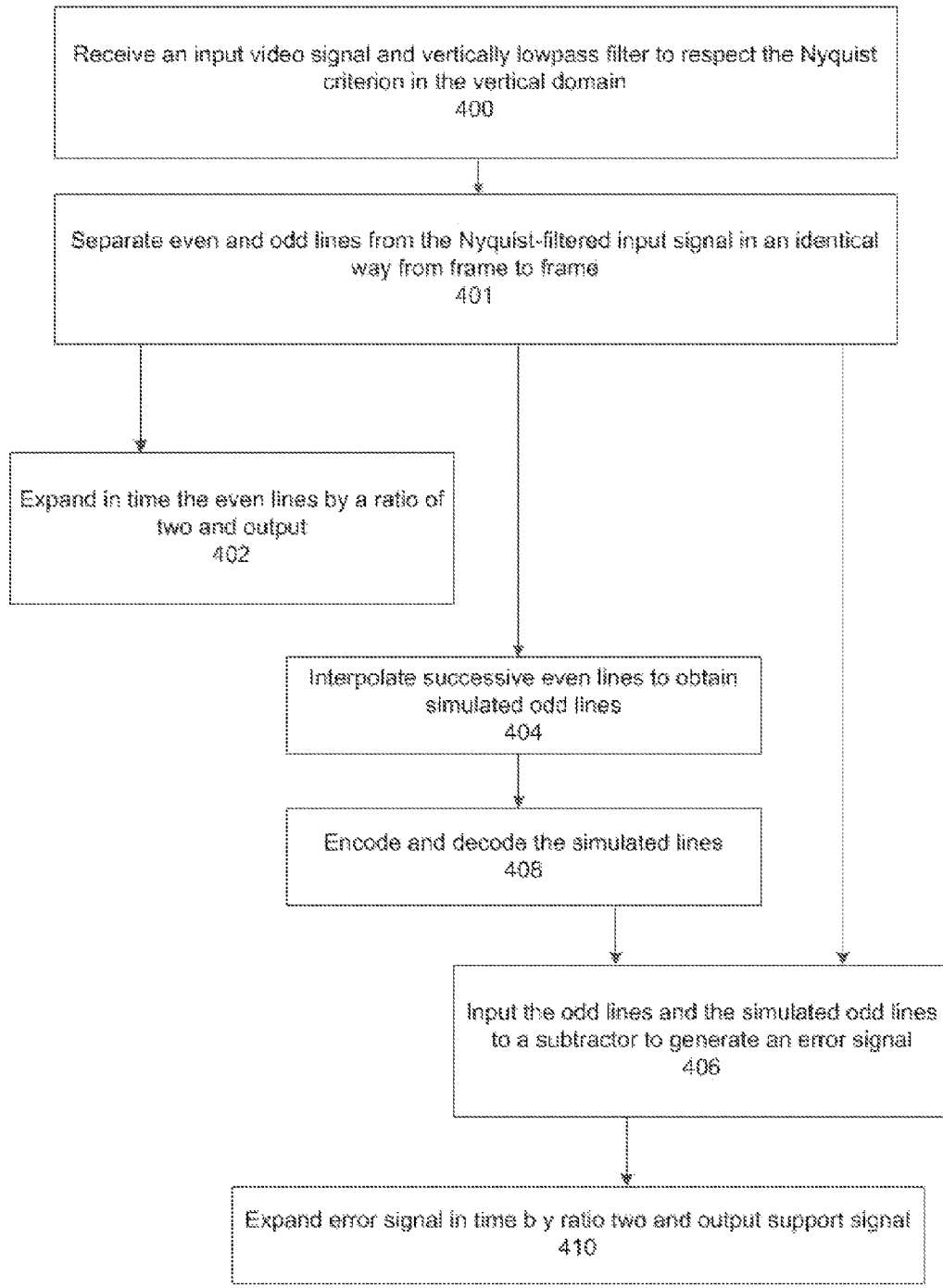
FIG. 4 is a flow diagram, which may be compared to FIG. 3, illustrating a process for processing a progressive scan video signal in accordance with aspects of the present invention.

FIG. 4 is a flow diagram, based on FIG. 3, illustrating a process for processing a progressive scan video signal according to aspects of the present invention. The process may begin by receiving an input progressive scan video signal having n progressively scanned lines per frame and vertical low-pass filtering the signal so as to provide a signal that respects the Nyquist criterion in the vertical domain (block 400). In an identical way from frame to frame, a separator separates even and odd lines in the input signal and selects even lines (block 401). A time expander expands in time the even lines by a ratio of two and outputs lines at n/2 progressively scanned lines per frame (block 402). The line interpolator interpolates successive even lines to obtain simulated odd lines (block 404). An encoder encodes the simulated odd lines and a decoder decodes the simulated odd lines (block 406). The odd lines from the separator are subtracted from the encoded/decoded simulated odd lines to generate an error signal (block 408). A time expander expands the error signal in time by a ratio of two and outputs a support signal (block 410).

Figure 5:
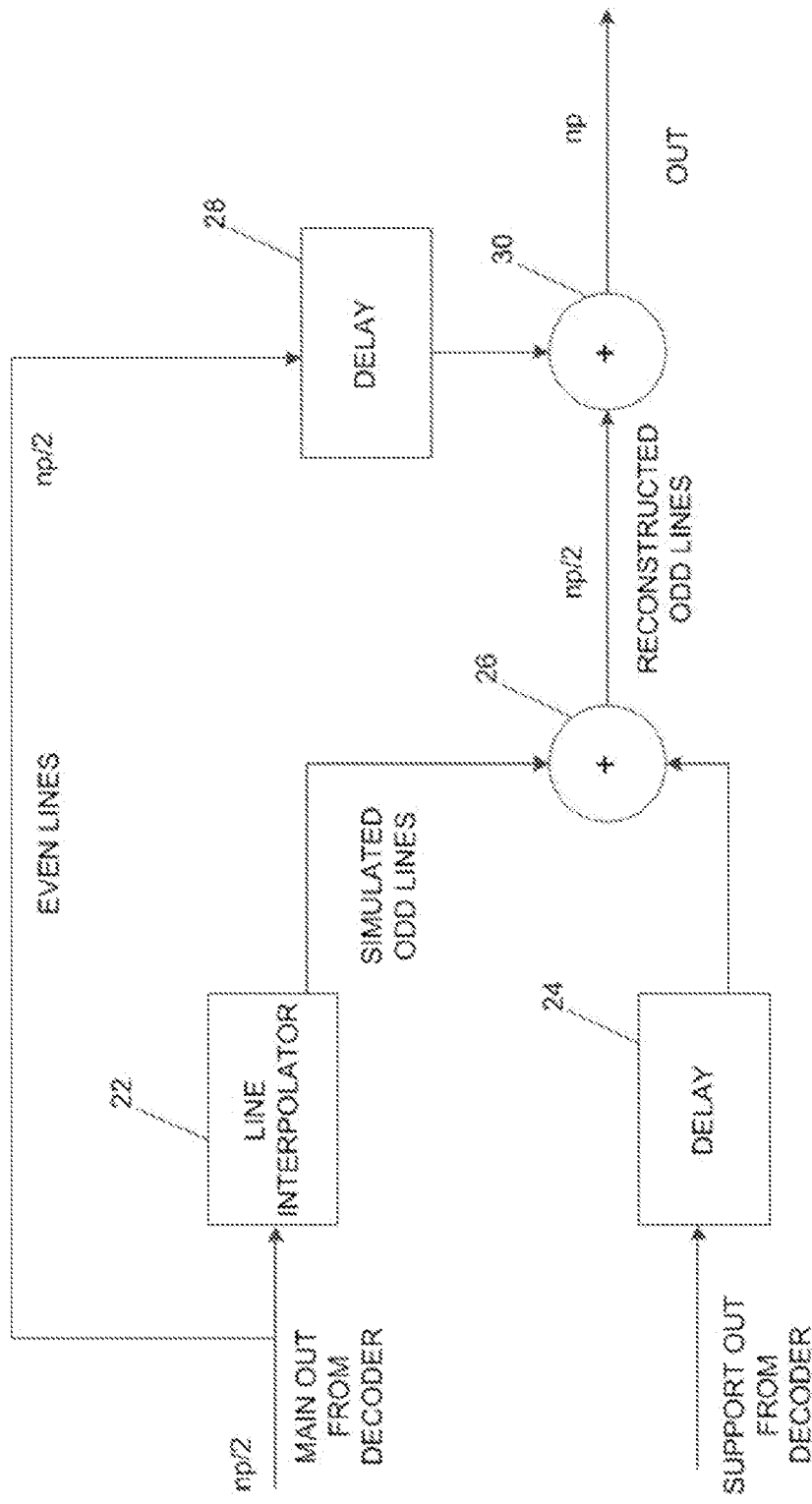
FIG. 5 is a schematic block diagram embodying aspects of the present invention illustrating a processor that follows transmission or storage of the signals generated by the processor of FIG. 1 or FIG. 3, and using the two signals generated by the processor of FIG. 1 or FIG. 3 to reconstitute a full progressive scan video signal having n progressively scanned lines per frame that approximates the original progressive scan input signal applied to the processor of FIG. 1 or FIG. 3.

FIG. 5 is the block diagram of a processor in accordance with aspects of the present invention. It may receive after transmission or storage and decoding (if the outputs of the processor of FIG. 1 or FIG. 3 are encoded) the two signals, originated as output 4 and output 6 of the processor of FIG. 1 or FIG. 3. Line Interpolator device or function 22 receives even lines, scanned having n/2 progressively scanned lines per frame, from an optional decoder (decoder not shown), and generates simulated odd lines through a line interpolation process. Delay device or function 24 receives the support signal from an optional decoder (decoder not shown), a signal that originates at output 6 of FIG. 1 or FIG. 3, and then is encoded and transmitted or stored and decoded. In Delay 24, this signal is delayed in order to match the delay of the Line Interpolator 22. A summing device or function ("Summer") 26 (shown schematically as a circle with a plus sign inside) arithmetically adds the simulated odd lines from Line Interpolator 22 and delayed support signal from Delay 24 and delivers reconstituted odd lines having n/2 progressively scanned lines per frame. Another Delay device or function 28 receives the decoded even lines, and performs a delay in order to match the delay in other paths. A further summing device or function ("Summer") 30 (shown schematically as a circle with a plus sign inside) receives the delayed even lines from Delay 28 and the reconstituted odd lines from Summer 26, and adds these two signals in order to obtain an output having n progressively scanned lines per frame.

If the support signal is not available (i.e., the simulated odd lines from Interpolator 22 are the only input to Summer 26 and, hence, are the reconstructed odd lines), the reconstructed progressive scan output from Summer 30 may still be useful even though it may not match the original signal as closely as if the support signal were available. This is particularly true when the unavailable support signal has a very low bandwidth.

Figure 6:
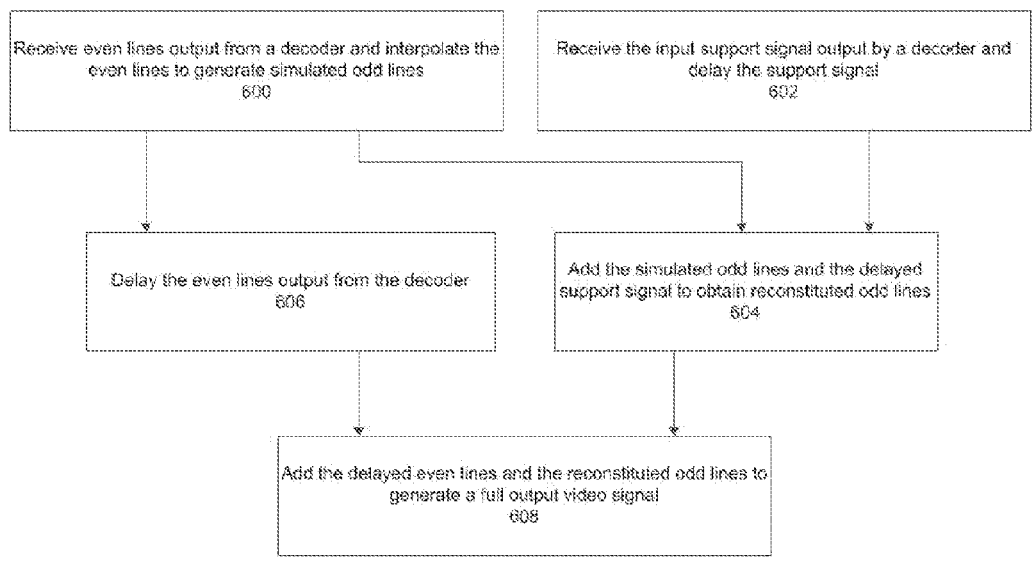
FIG. 6 is a flow diagram, which may be compared to FIG. 5, illustrating processing of the even lines and the support signal.

FIG. 6 is a flow diagram illustrating processing of the even lines and the support signal corresponding to FIG. 5. The process may begin by receiving even lines output and support signal output from an optional decoder and interpolating the even lines to generate simulated odd lines (block 600). The support signal output by the optional decoder is received by a delay, which delays the support signal and generates a delayed support signal (block 602). The simulated odd lines and the delayed support signal are added to obtain reconstituted odd lines (block 604). The even lines output from the decoder are received by a delay to generate delayed even lines (block 606). The delayed even lines and reconstituted odd lines are added to generate a full output video signal having n progressively scanned lines per frame (block 608).

Figure 7:
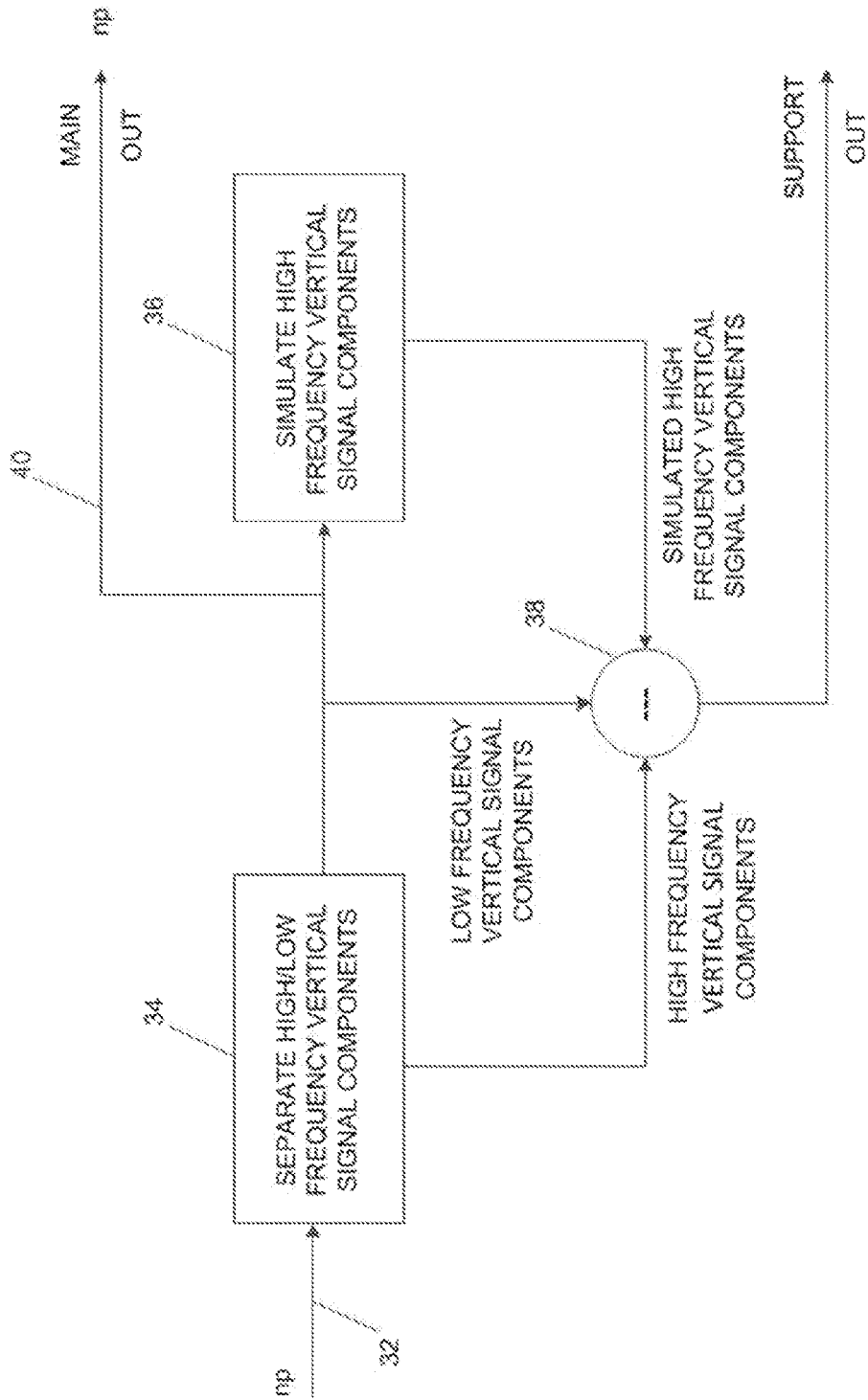
FIGS. 7-9 are schematic block diagrams embodying aspects of the present invention illustrating alternative implementations of the structures and processes described in FIGS. 1-6, in which the separation between even and odd lines is replaced by a separation between high-frequency vertical signal components and low-frequency vertical signal components.
Figure 8:
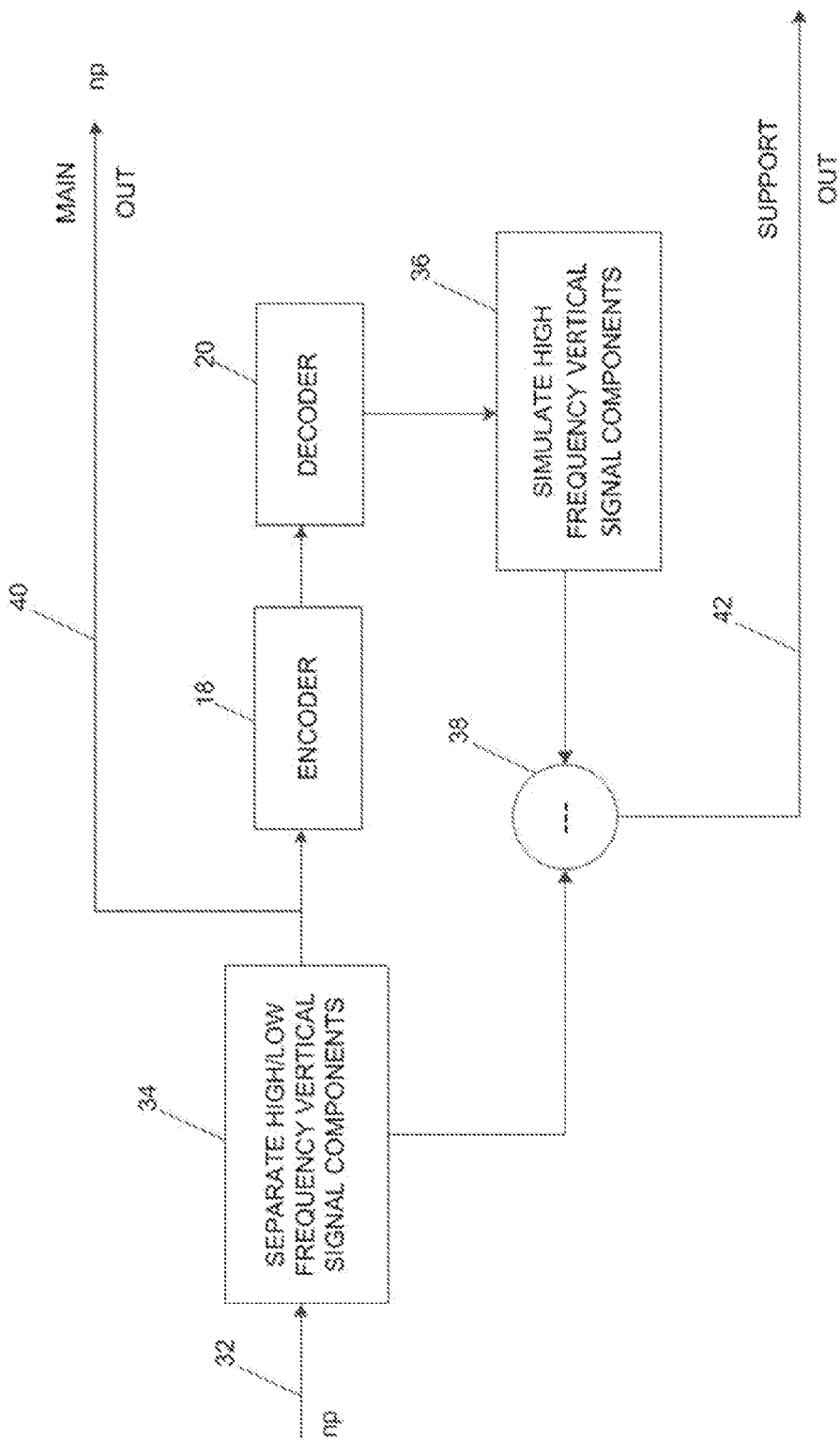
Figure 9:
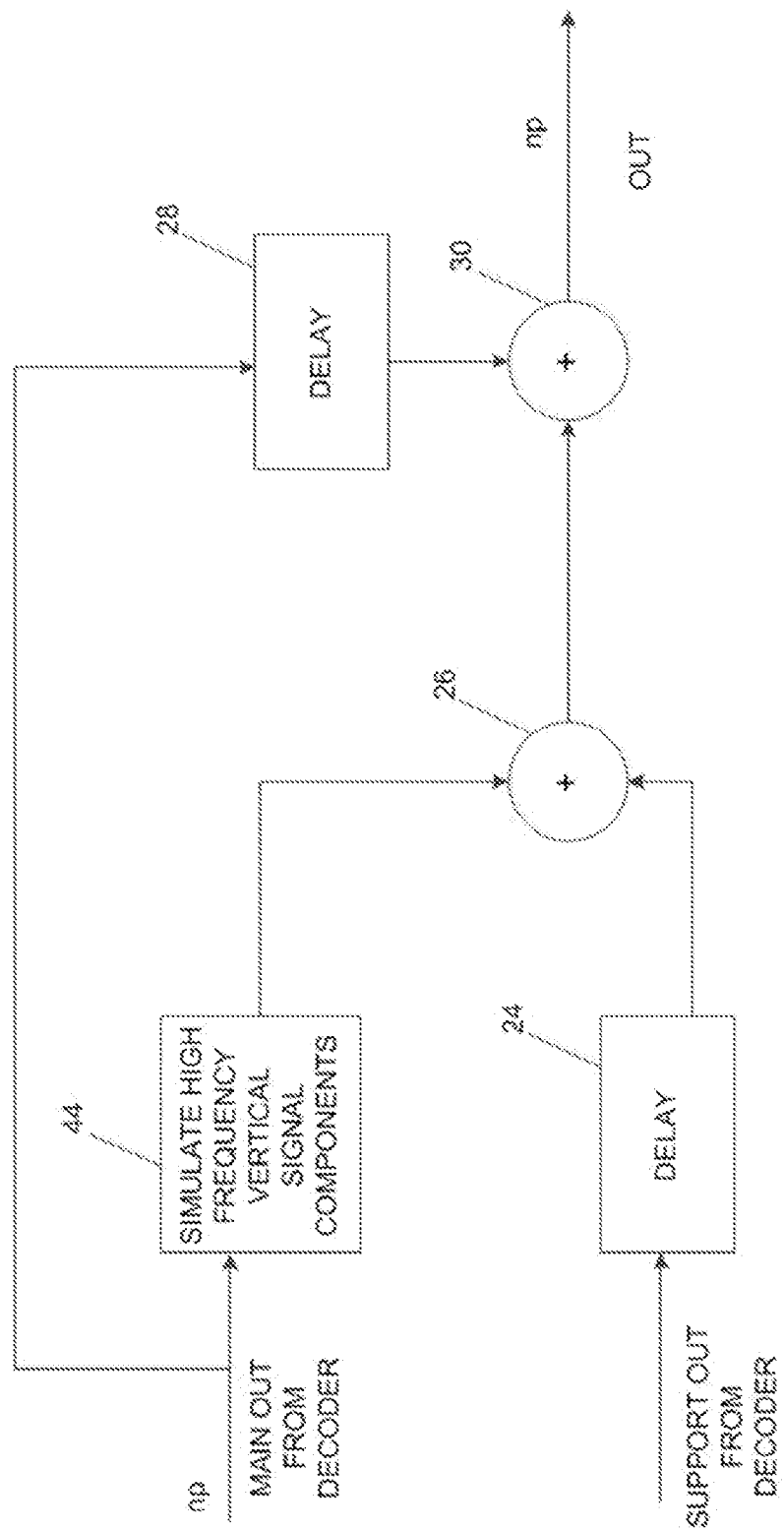

FIGS. 7-9 are schematic diagrams illustrating alternative implementations of the devices and functions described in FIGS. 1-6, in which separation between even and odd lines is replaced by separation between high- and low-vertical-frequency signal components.

In these alternative aspects of the present invention, the method for processing a video signal comprises receiving a progressive scan video signal and separating high and low frequency vertical signal components of the progressive scan video signal into two paths; generating simulated high-frequency vertical signal components from the low-frequency vertical signal components of the progressive video signal; subtracting the simulated high-frequency vertical signal components from the high-frequency vertical signal components of the progressive video signal to obtain a support signal; and transmitting low-frequency vertical signal components of the input signal and the support signal.

FIG. 7 is a block diagram of an alternative implementation of the aspects of the invention shown in FIG. 1. A "Separate High-Low Vertical Frequencies" device or function ("Separator") 34 separates high-frequency vertical signal components from low-frequency vertical signal components of the progressive scan video input signal (32) having n progressively scanned lines per frame. The way in which high-frequency vertical signal components are separated from low-frequency vertical signal components is not critical to the invention. One suitable way is to perform vertical high-pass and low-pass frequency signal component filtering. This may be accomplished by matrixing the outputs of successive one scanning line delays to obtain a desired filtering in the vertical domain. A "Simulate High Frequency Vertical Signal Components" device or function ("Simulator") 36 receives the low-frequency vertical signal components from device or function 34 and performs a non-linear process in order to generate an approximation of the high-frequency vertical signal components of the progressive scan input signal. Such non-linear processes are well known and the use of any particular one is not critical to the invention.

A Subtractor device or function 38 (shown schematically as a minus sign within a circle) is an arithmetic subtractor that subtracts the separated out original high-frequency vertical signal components from the simulated high-frequency vertical signal components from Simulator 36 in order to generate a "support" error signal representative of the differences between the actual progressive scan signal and the progressive scan signal having simulated high-frequency vertical signal components.

FIG. 8 is a schematic block diagram of aspects of the present invention relating to another embodiment of a processor that makes use of a progressive scan video signal source having n progressively scanned lines per frame to generate a progressive scan video signal output having n progressively scanned lines per frame and a support signal. Separator 34 separates high-frequency vertical signal components from low-frequency vertical signal components in the video signal. Separator 34 and Simulator 36 may be the same as those devices and functions in the schematic diagram of FIG. 5. Encoder 18 is an optional encoder, simulating the effect of the encoder that is in the transmission path and is followed by an optional decoder, Decoder 20. Decoder 20 may be a decoder complementary to encoder 18 and duplicating the structure and function of the decoder that is used at the receiving end of the transmission or storage path. Encoder 18 and Decoder 20 may be inserted between Separator 34 and Simulator 36. They contribute to generating simulated high-frequency vertical signal components that are closer to ideal simulated high-vertical-frequency signal components than if they were not employed.

FIG. 9 is a schematic block diagram of an alternative embodiment of a processor in accordance with aspects of the present invention. It may receive after transmission or storage and decoding (if the outputs of the pre-processor of FIG. 7 or FIG. 8 are encoded) the two signals, originated as output 40 and output 42 of the processor of FIG. 7 or FIG. 8.

"Simulate High Frequency Vertical Signal Components" device or function ("Simulator") 44 receives low-frequency vertical signal components, progressively scanned at n lines per frame, from the decoder (decoder not shown), and generates simulated high-frequency vertical signal components. The Simulator 44 receives the low-frequency vertical signal components and performs a non-linear process in order to generate an approximation of the high-frequency vertical signal components of the progressive scan input signal. Such non-linear processes are well known and the use of any particular one is not critical to the invention.

Delay device or function 24 receives the support signal from the decoder, a signal that originates at the separated out low-frequency vertical signal components output signal of Separator 34 in FIGS. 7 and 8. After being encoded, transmitted or stored, and decoded, it is delayed in Delay device or function ("Delay") 24 in order to match the delay of the simulated high-frequency vertical signal components. Summing device or function 26 is an arithmetic adder that, by adding the simulated high-frequency vertical signal components from Simulator 44 and the delayed support signal from Delay 24, delivers reconstituted high-frequency vertical signal components. Delay 28 receives the decoded low-frequency vertical signal components and performs a delay in order to match the delay of the path of devices or functions in other paths. Summing device or function 30 receives the delayed low-frequency vertical signal components from Delay 28, and the reconstituted high-frequency vertical signal components from Summer 26 and adds these two signals in order to obtain an output having n progressively scanned lines per frame with substantially full vertical bandwidth.

A method and system for pre-processing a progressively scanned video signal has been disclosed. The present invention has been described in accordance with the embodiments shown, and there could be variations to the embodiments, and any variations would be within the spirit and scope of the present invention. For example, an exemplary embodiment may be implemented using hardware, software, a computer readable medium containing program instructions, or a combination thereof. Software written according to the present invention may be either stored in some form of computer-readable medium such as a memory, a hard disk, or a CD/DVD-ROM and may be executed by a processor. Accordingly, many modifications may be made by one of ordinary skill in the art without departing from the spirit and scope of the appended claims.

If the support signal is not available (i.e., the simulated high-vertical-frequency signal components from Simulator 44 are the only input to Summer 26 and, hence, are the reconstructed odd lines), the reconstructed progressive scan output from Summer 30 may still be useful even though it may not match the original signal as closely as if the support signal were available. This is particularly true when the unavailable support signal has a very low bandwidth.

The present invention and its various aspects may be implemented in analog circuitry, or, for example, as software functions performed in digital signal processors, programmed general-purpose digital computers, and/or special purpose digital computers. Interfaces between analog and digital signal streams may be performed in appropriate hardware and/or as functions in software and/or firmware. Although the present invention and its various aspects may involve analog or digital signals, in practical applications most or all processing functions are likely to be performed in the digital domain on digital signal streams in which video signals are represented by samples.

The invention claimed is:

1. A method for processing a progressive scan video signal, the video signal having scan lines in which one set of alternate consecutive scan lines are designated as even scan lines and another set of alternate consecutive scan lines, offset by one scan line from the first set, are designated as odd scan lines, comprising:
    separating the even and odd scan lines of the progressive scan video signal and selecting the even scan lines,
    deriving a simulation of the odd scan lines from the selected even scan lines,
    subtracting the simulation of the odd scan lines from the selected odd scan lines to obtain an error signal, and
    transmitting or storing the selected even scan lines and the error signal.

2. A method for processing a progressive scan video signal according to claim 1 wherein said deriving includes an encoder and a complementary decoder.

3. A method for processing a modified progressive scan video signal comprising even scan lines of a progressive scan video signal and an error signal, the error signal representing a difference between the odd scan lines of the progressive scan video signal and a simulation of the odd scan lines, wherein even scan lines are one set of alternate consecutive scan lines in the progressive scan video signal and odd scan lines are another set of alternate consecutive scan lines in the progressive scan video signal, offset by one scan line from the first set, the method comprising
    deriving from the even scan lines in the modified progressive scan video signal a simulation of the odd scan lines of the progressive scan video signal,
    improving the reconstruction of the odd scan lines of the progressive scan video signal by using the error signal, and
    combining the even scan lines and the improved reconstruction of the odd scan lines of the progressive scan video signal to provide a complete line scan of said progressive scan video signal.

4. A method for processing a progressive scan video signal, comprising:
    separating the low frequency vertical signal components and the high frequency vertical signal components of the progressive scan video signal,
    deriving a simulation of the high frequency vertical signal components from the low frequency vertical signal components of the progressive scan video signal,
    subtracting said simulation from the high frequency vertical components separated from the progressive scan video signal to obtain an error signal, and transmitting or storing the low frequency vertical signal components of the progressive scan video signal and the error signal.

5. A method for processing a progressive scan video signal according to claim 4 wherein said deriving includes an encoder and a complementary decoder.

6. A method for processing a modified progressive scan video signal comprising the low frequency vertical signal components of a progressive scan video signal and an error signal, the error signal representing a difference between the high frequency vertical signal components of the progressive scan video signal and a simulation of those signal components, the method comprising deriving from the modified progressive scan video signal a simulation of high frequency vertical signal components of said progressive scan video signal, and improving the reconstitution of the high frequency vertical signal components of said progressive scan video signal by using the error signal, and combining the improved reconstitution of the high frequency vertical signal components of said progressive scan video signal and the low frequency vertical components of said progressive scan video signal to provide a full bandwidth of the progressive scan video signal.

7. A method for processing a progressive scan video signal, the video signal having scan lines in which one set of alternate consecutive scan lines are designated as even scan lines and another set of alternate consecutive scan lines, offset by one scan line from the first set, are designated as odd scan lines, comprising:

separating the even and odd scan lines of the progressive scan video signal and selecting the even scan lines, deriving a simulation of the odd scan lines from the selected even scan lines, subtracting the simulation of the odd scan lines from the selected odd scan lines to obtain an error signal, deriving from the even scan lines a simulation of the odd scan lines of the progressive scan video signal, improving the reconstruction of the odd scan lines of the progressive scan video signal by using the error signal, and combining the even scan lines and the improved reconstruction of the odd scan lines of the progressive scan video signal to provide a complete line scan of said progressive scan video signal.

8. A method for processing a progressive scan video signal, comprising:

separating the low vertical frequency and high frequency vertical signal components of the progressive scan video signal, deriving a simulation of the high frequency vertical signal components of the progressive scan video signal from the low frequency vertical signal components, subtracting said simulation from the high frequency vertical signal components separated from the progressive scan video signal to obtain an error signal, deriving from the modified progressive scan video signal a simulation of high frequency vertical signal components of said progressive scan video signal, improving the reconstitution of the high frequency vertical signal components of said progressive scan video signal by using the error signal, and combining the improved reconstitution of the high frequency vertical signal components of said progressive scan video signal and the low frequency vertical components of said progressive scan video signal to provide a full bandwidth of the progressive scan video signal.

* * * * *